United States Patent [19]
Stolberg

[11] Patent Number: 6,002,875
[45] Date of Patent: Dec. 14, 1999

[54] METHOD FOR THE REDUCTION OF INSTRUCTION CACHE MISS RATE USING OPTIMIZATION DATA FROM TRACE DATA PROFILES

[75] Inventor: Hans-Joachim Stolberg, Tokyo, Japan

[73] Assignee: NEC Corporation, Tokyo, Japan

[21] Appl. No.: 08/951,744

[22] Filed: Oct. 16, 1997

[30] Foreign Application Priority Data

Oct. 16, 1996 [JP] Japan ................................ 8-273222

[51] Int. Cl.⁶ ........................................ G06F 9/44
[52] U.S. Cl. ........................................ 395/709; 395/704
[58] Field of Search ............................ 395/709, 800, 395/184, 704, 650, 500, 186, 701, 702, 703, 705, 706, 707, 708, 710, 712

[56] References Cited

U.S. PATENT DOCUMENTS

| | | | |
|---|---|---|---|
| 5,121,492 | 6/1992 | Saville, III et al. | 395/500 |
| 5,325,525 | 6/1994 | Shan et al. | 395/650 |
| 5,446,876 | 8/1995 | Levine et al. | 395/184 |
| 5,581,778 | 12/1996 | Chin et al. | 395/800 |
| 5,768,500 | 6/1998 | Agrawal et al. | 395/184 |
| 5,774,724 | 6/1998 | Heisch | 395/704 |
| 5,809,450 | 9/1998 | Chrysos et al. | 702/186 |
| 5,862,385 | 9/1999 | Iitsuka | 395/709 |

OTHER PUBLICATIONS

Pettis et al., "Profile Guided Code Positioning", Proc. Conf. on Programming Language Design and Implementation, pp. 16–26 (1990).

Hwu et al., "Achieving High Instruction Cache Performance with an Optimizing Compiler", Proc. 16th Ann. Int'l. Symp. on Computer Architecture, pp. 242–251 (1989).

Efficient Memory Programming David Loshin pp. 57–58 Nov. 1998.

Microsoft Visual C++ Source Profiler User's Guide pp. 1–72, 1993.

*Primary Examiner*—Tariq R. Hafiz
*Assistant Examiner*—Todd Ingberg
*Attorney, Agent, or Firm*—Foley & Lardner

[57] ABSTRACT

A method for the reduction of instruction cache misses comprises step of generating function profiles of potential cache misses, step of computing function activities and dividing them in nonzero-activity functions and zero-activity functions, step of allocating all the nonzero-activity functions to cache space, step of mapping the nonzero-activity functions from cache space to memory space, step of mapping the zero-activity functions so as to fill allocation holes in memory space.

12 Claims, 9 Drawing Sheets

METHOD FOR THE REDUCTION OF INSTRUCTION CACHE MISS RATE USING OPTIMIZATION DATA FROM TRACE DATA PROFILES

BACKGROUND OF THE INVENTION

1. Field of the invention

The present invention relates to a method for the reduction of instruction cache miss rate in an application program running on a microprocessor with an instruction cache.

2. Description of the Related Art

Conventionally, the link order of functions has been modified merely on base of statistical data such as call graph information, and they have been appended to form a linear list in memory, as described for example in "Profile Guided Code Positioning" (by K. Pettis and R. C. Hansen, Proc. Conf. On Programming Language Design and Implemenation, pp. 16–26, June 1990).

However, statistical data such as call graph information does not give certainty about cache misses, since it does not contain sequential information on memory accesses that is essential for evaluating cache behavior. Furthermore, in merely appending functions one to another in memory, flexibility in positioning is very limited.

In other applications, code positioning has been performed a basic block level, again using statistical information such as call graphs or execution frequencies, as described for example in "Achieving High Instruction Cache Performance with an Optimizing Compiler" (by W.-m. Hwu and P. Chang, Proc. 16th Ann. Int'l. Symp. On Computer Architecture, pp. 242–251, June 1989).

However, again sequential information on memory accesses essential for cache behavior cannot be exploited due to the use of merely statistical data. Furthermore, implementation is much more complicate since massive modification of object code is required for basic block positioning.

In addition, in many RISC architectures, direct-mapped caches are employed for their simplicity and short access times to alleviate the gap between processor clock and memory access time. The direct-mapped organization, however, can lead to frequent cache line conflicts during program execution in case of unfavourable code layout, resulting in serious performance degradation.

SUMMARY OF THE INVENTION

Therefore, it is an object of the present invention to provide a method for reducing instruction cache misses in the application program by positioning code in function units based on their profiles of potential cache misses, so that overlapping of code parts with high cache miss probability in cache will be mostly avoided.

According to the first aspect of the invention, a method for the reduction of instruction cache misses in an application program running on a microprocessor having an instruction cache, comprising the steps of:

generating profiles of potential cache misses by extracting potential cache misses from an instruction trace and storing them into an access table, detecting first functions where potential cache misses are counted and second functions where no potential cache misses are counted by computing function activities of the application program based on said profiles, allocating all the first functions to a cache space, mapping the first functions allocated to said cache space to a memory space, and mapping the second functions so as to fill allocation holes in said memory space.

The step of generating profiles may comprise the steps of:

collecting instruction trace data through simulation, generating a function table which contains for each function of said application program the address range in the memory space, divided into cache line units according to the organization of the cache space of said instruction cache, counting only memory accesses to instructions listed in the instruction trace data to each of the cache line units based on said function table within execution of one function of said application program, and storing in said access table the number of the counted accesses for cache line unit of each function of the application.

The step of allocating the first functions to the cache space may comprise the steps of:

sorting the first functions according to the activities of the potential cache misses which have been computed based on the profiles to determine the order of successive allocation, selecting the first function with highest activity value from the unprocessed first functions, determining each position of the first functions in the cache space so as to lead the profiles to the most equal distribution, and mapping the first functions from the cache space to the memory space so that each instruction is assigned to a unique memory address, after finishing the allocation to the cache space with respect to all the first functions of said application program.

The step of generating profiles may comprise the steps of:

collecting instruction trace data through simulation, generating a function table which contains for each function of said application program the address range in the memory space, divided into cache line units according to the organization of the cache space of said instruction cache, counting only memory accesses to instructions listed in the instruction trace data to each of the cache line units based on said function table within execution of one function of said application program, and storing in said access table the number of the counted accesses for cache line unit of each function of said application program, while said step of allocating the first functions to the cache space comprises the steps of:

sorting the first functions according to the activities of the potential cache misses which have been computed based on the profiles to determine the order of successive allocation, selecting the first function with highest activity value from the unprocessed first functions;

determining each position of the first functions in the cache space so as to lead the profiles to the most equal distribution, and mapping the first functions from the cache space to the memory space so that each instruction is assigned to a unique memory address, after finishing the allocation to the cache space with respect to all the first functions of said application program.

The step of generating profiles may comprise the steps of:

collecting instruction trace data through simulation, generating a function table which contains for each function of said application program the address range in the memory space, divided into cache line units according to the organization of the cache space of said instruction cache, counting only memory accesses to instructions listed in the instruction trace data to each of the cache line units based on said function table within execution of one function of said application program, and storing in said access table the number of the counted accesses for cache line unit of each function of said application program, while said step of counting the memory accesses counts only the first access listed in the instruction trace and counts the first accesses to the cache line units again whenever a new function call has occurred in said application program.

According to the second aspect of the invention, a method for the reduction of instruction cache misses in an application program running on a microprocessor with an instruction cache, comprising the steps of:

extracting profiles of potential cache misses from an instruction trace under consideration of original function layouts and cache parameters;

sorting the functions of said application program according to the profiles of the potential cache misses;

allocating the functions to the cache space successively so as to lead the profiles to the most equal distribution;

mapping all the functions from the cache space to the memory space while inducing allocation holes; and linking the functions in the predetermined order while inserting the allocation holes where necessary.

According to the third aspect of the invention, a computer readable memory having a computer program for reducing instruction cache misses in an application program running on a microprocessor with an instruction cache, said computer program comprising the steps of:

generating profiles of potential cache misses by extracting potential cache misses from an instruction trace and storing them into an access table;

detecting first functions where potential cache misses are counted and second functions where no potential cache misses are counted by computing function activities of the application program based on said profiles;

allocating all the first functions to a cache space;

mapping the first functions allocated to said cache space to a memory space; and mapping the second functions so as to fill allocation holes in said memory space.

According to another aspect of the invention, a computer readable memory having a computer program for reducing instruction cache misses in an application program running on a microprocessor with an instruction cache, said computer program comprising the steps of:

extracting profiles of potential cache misses from an instruction trace under consideration of original function layouts and cache parameters;

sorting the functions of said application program according to the profiles of the potential cache misses;

allocating the functions to the cache space successively so as to lead the profiles to the most equal distribution;

mapping all the functions from the cache space to the memory space while inducing allocation holes; and linking the functions in the predetermined order while inserting the allocation holes where necessary.

Other objects, features and advantages of the present invention will become clear from the detailed description given herebelow.

BRIFE DESCRIPTION ON THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to not unnecessarily obscure the present invention.

The invention is used in the implementation of the application program running on programmable microprocessors with instruction caches, where low instruction cache miss rate is desired. One example could be, but is not limited to, the implementation of multimedia applications on a RISC microprocessors in a low-cost system environment. Here, a large number of stall cycles due to slow external memory accesses can be avoided, and the multimedia application is accelerated. Another example could be, but is not limited to, the implementation of real-time applications on an embedded microprocessor. Here, a low number of cache misses for the worst case is essential to guarantee functionality.

Figure 1:
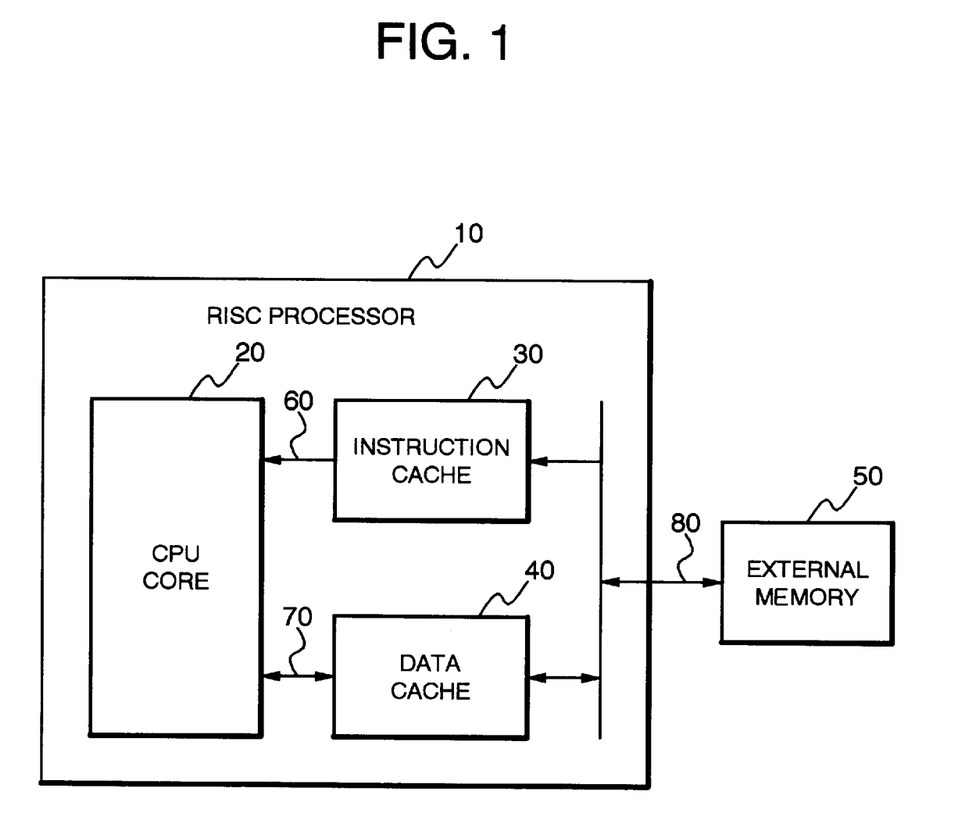
FIG. 1 is a block diagram illustrating the memory architecture of a RISC processor.

In this embodiment, the application of the present invention to program development on a RISC processor is explained. FIG. 1 shows a block diagram of a typical RISC processor and its storage hierarchy in a low-cost system environment without a second-level cache.

A typical RISC processor 10 comprises the following elements on-chip: a CPU core 20, an instruction cache 30 and a data cache 40. The instruction cache 30 is connected to the CPU core 20 via an internal instruction bus 60, and the data cache 40 is connected to the CPU core 20 via an internal data bus 70. Both internal instruction bus 60 and internal data bus 70 are clocked with the same clock frequency as the CPU core 20. Cached instructions and data can be accessed by the CPU core 20 within one clock cycle. The instruction cache 30 and data cache 40 are connected to an external memory 50 via an external bus 80. The clock of the external bus 80 is a fraction of the CPU core clock, since the external memory 50 has longer access times. Therefore, in order to achieve highest performance, accessed instructions and data should be available in the instruction cache 30 and the data cache 40 as frequent as possible so as to avoid slow accesses to the external memory 50. This embodiment can be applied here to reduce the instruction cache miss rate so that most executed instructions will be found in the instruction cache 30.

Figure 2:
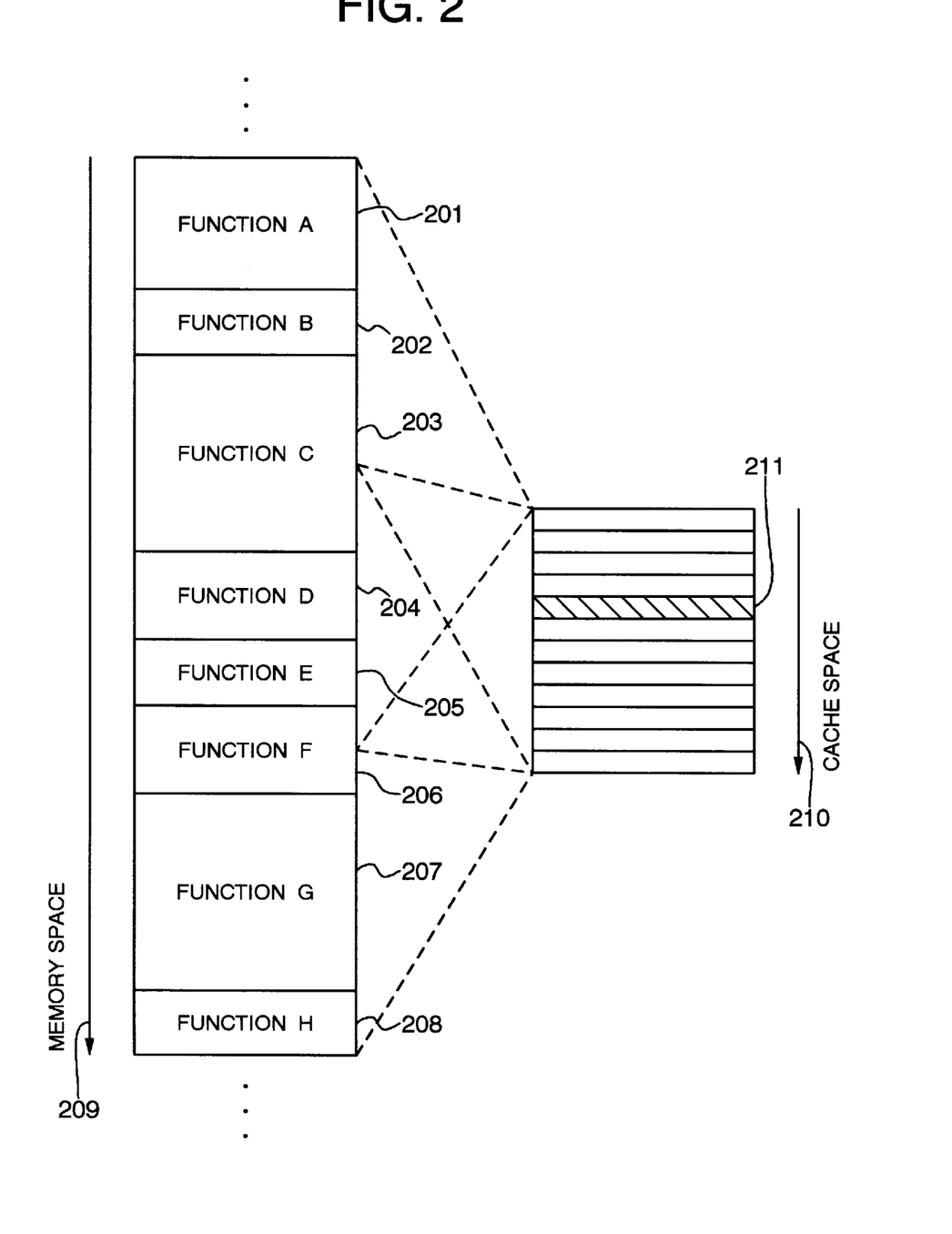
FIG. 2 is a diagram illustrating the memory layout of a typical program and its mapping to a direct-mapped cache.

The memory utilization by the program code is illustrated in FIG. 2. It shows the function layout for an example program in the memory space and its mapping to the cache space. In this example, the program consists of function A 201, function B 202, function C 203, function D 204, function E 205, function F 206, function G 207 and function H 208, which are located in the memory space 209 in consecutive order as determined by the linker. The memory space 209 maps to the cache space 210 in a modulo manner, so that several instructions in the memory space 209 compete for each entry in the cache space 210. The cache space 210 is divided into a plurality of cache line unit 211 which constitute the smallest replacement units. In a direct-mapped cache, which will be assumed for the purpose of this example, each instruction in the memory space 209 has exactly one corresponding address in the cache space 210 where it maps to.

The method for reducing instruction cache miss rate according to this preferred embodiment is achieved by the computer program running on the RISC processor 10. This computer program is offered by being stored in the storage medium including a magnetic disk and a semiconductor memory.

Figure 3:
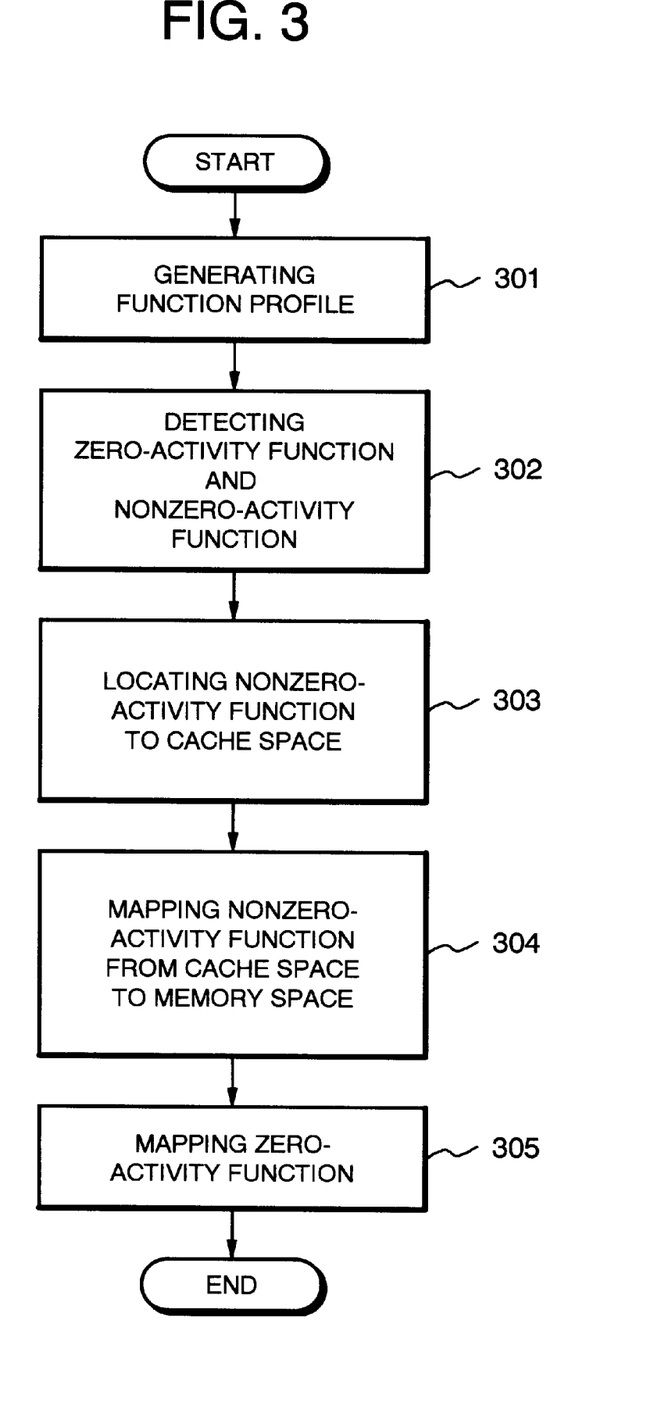
FIG. 3 is a flow chart to explain the operation of this preferred embodiment roughly.

Next, the outline of the operation for the reduction of instruction cache miss rate by this preferred embodiment is explained. FIG. 3 is a flow chart to explain the operation of this preferred embodiment roughly.

First, profiles of potential cache misses are generated by extracting potential cache misses from an instruction trace data and storing potential cache misses into an access table (Step 301). Next, nonzero-activity functions where potential cache misses are counted and zero-activity functions where no potential cache misses are counted are detected by computing activities of each function of the program based on the profiles (Step 302).

Then, all the nonzero-activity functions are allocated to cache space (Step 303). And, the nonzero-activity functions allocated to the cache space are mapped to memory space (Step 304). Finally, the zero-activity functions are mapped to the memory space so as to fill allocation space in the memory space (Step 305).

The operation of the preferred embodiment is explained in detail separately for the generation of the profile (first part) and the allocation of the activity function (second part).

Figure 4:
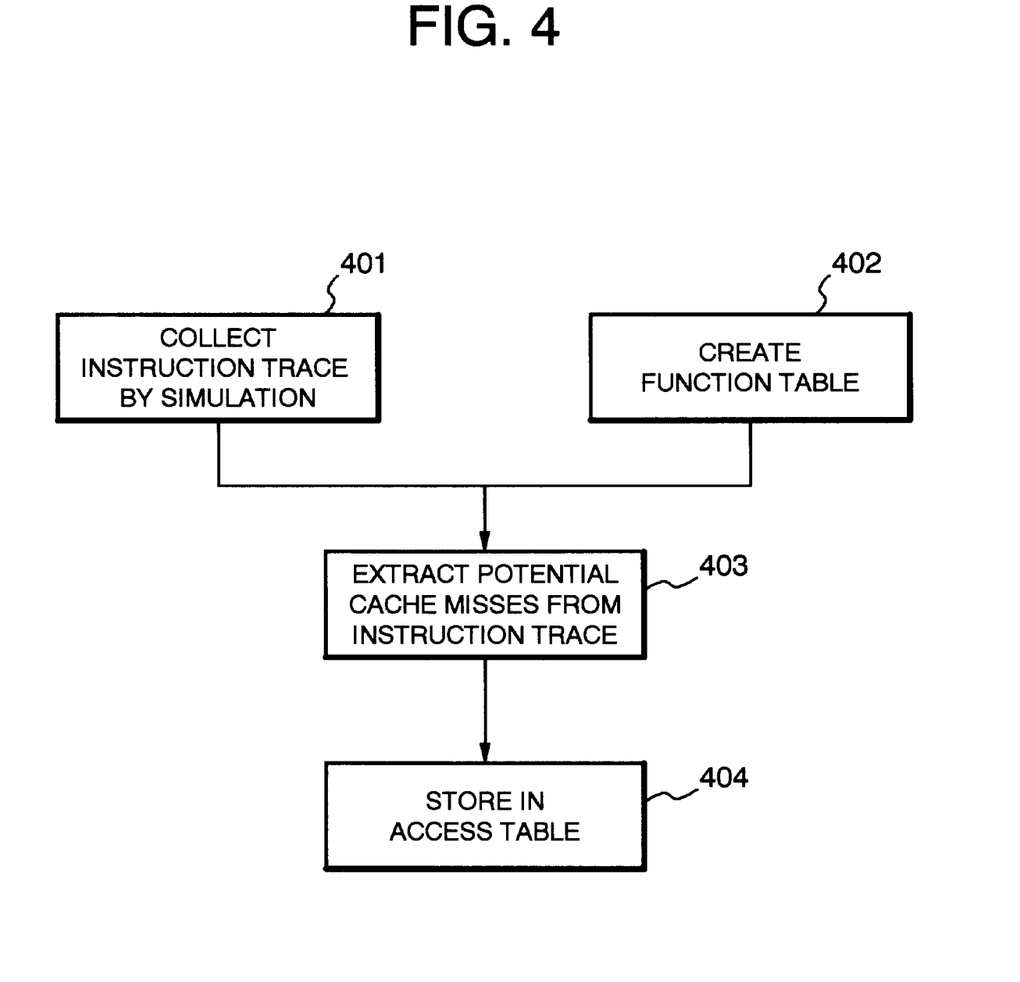
FIG. 4 is a flow chart illustrating the first part of the invention where profiles of potential cache misses are generated.

Now the application of the invention to a program as shown in FIG. 2 in order to decrease instruction cache miss rate is explained. FIG. 4 shows a flow chart of the steps performed in the first part of the method according to the invention, where profiles of potential cache misses are generated.

First, an instruction trace is collected 20 by simulating the execution of the target program on the target RISC processor (Step 401). Additionally, a function table is created which contains for each function of the program the address range in the memory space 209 (Step 402). The function table is divided into cache line units 211 according to the organization of the instruction cache 30. With this information, only those memory accesses to instructions listed in the instruction trace are counted, which can actually lead to cache misses when assuming function units of the simulated program to be preserved in the final code layout (Step 403). The numbers of possible cache misses per cache line units 211 for each function are stored in an access table (Step 404). The contents of the access table are hereafter referred to as profiles of potential cache misses.

Figure 5:
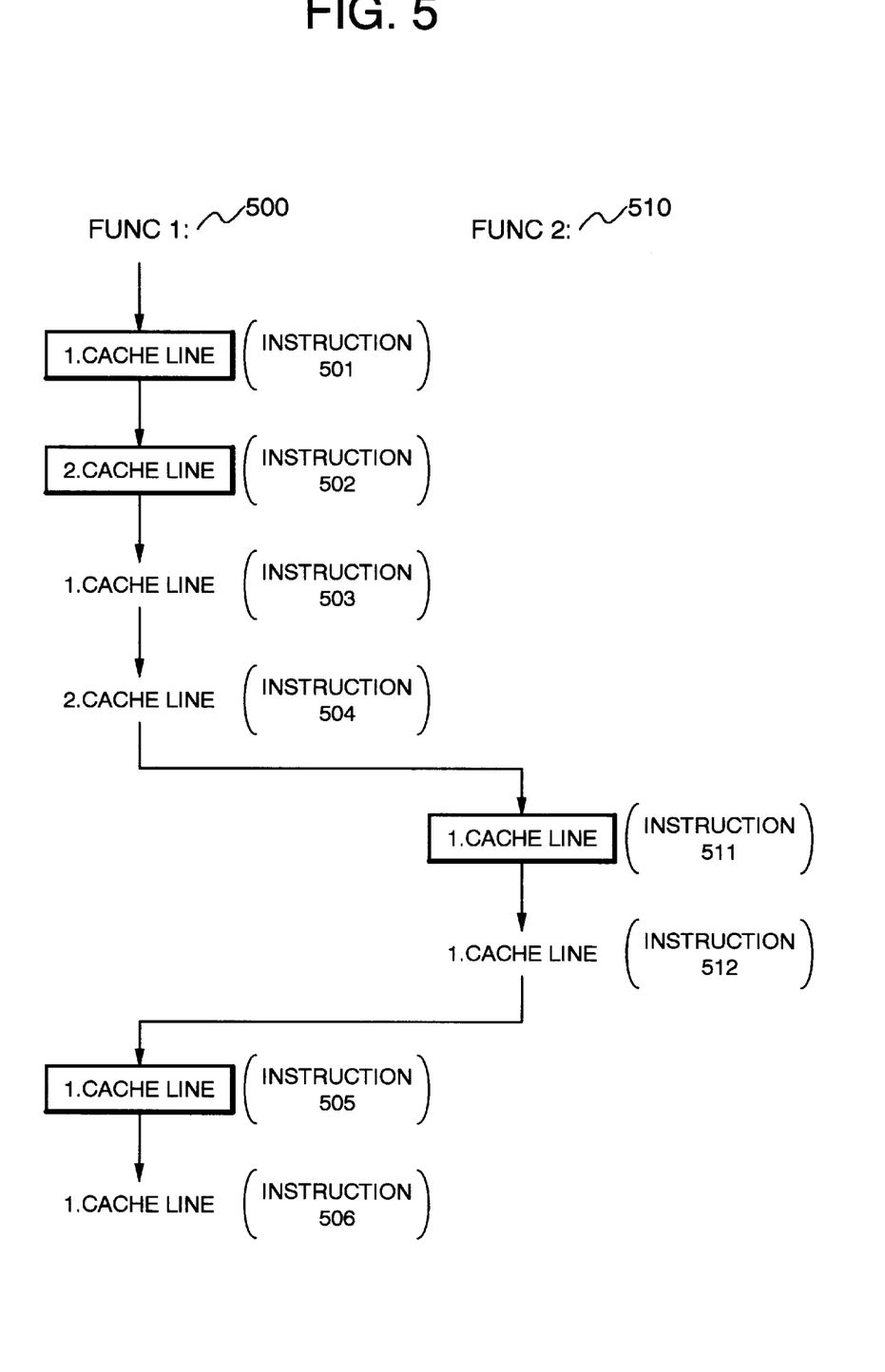
FIG. 5 is a first example illustrating the scheme for counting potential cache misses.

The scheme how to identify potential cache misses in the instruction trace is demonstrated by an example in FIG. 5. In this example, two functions 500 and 510 are alternately executed. It shall be assumed that in the first call of function 500 its first executed instruction 501 maps to the first of all cache lines in the scope of function 500. The second instruction 502 in the first call of function 500 is assumed to map to the second cache line of function 500. The third instruction 503 is assumed to access again the first cache line, and the fourth instruction 504 again the second cache line of function 500.

At the start of function 500, all its instructions have to be assumed as not present in the cache since they might have been replaced by intermediate execution of other functions, even if function 500 has already been executed before. Therefore, the first access by the first instruction 501 which goes to the first cache line and the second access by the second instruction 502 which goes to the second cache line have to be counted as potential cache misses. However, as long as no other function is executed, all once accessed cache lines will remain in cache, assuming the size of a function not to exceed cache size. Therefore, the access by the third instruction 503 and the access by the fourth instruction 504 are sure to be served by cache hits, and they are consequently not counted as potential cache misses.

However, when a new function is called as function 510 in FIG. 5, the initial access by the instruction 211 to each cache line in the scope of this function has to be counted again as potential cache miss, whereas the next access by the instruction 512 to the same cache line is guaranteed to be a cache hit. Even when an already previously executed function, as function 500 in this example, is called again, the initial access by the instruction 505 to a cache line may be a cache miss and has therefore to be counted, whereas the following access by the instruction 506 is not counted. That is because the final function layout in memory is not yet defined in this stage, and the intermediately executed function 510 might have replaced function 500 in cache.

Figure 6:
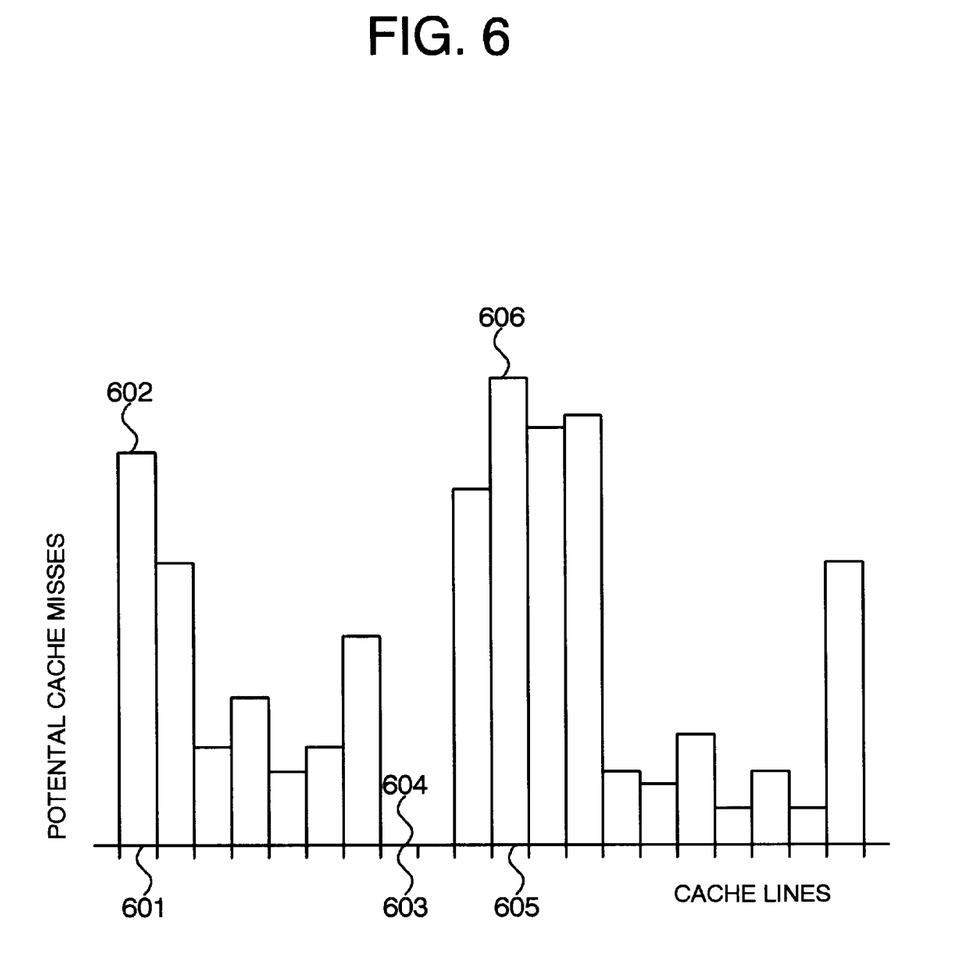
FIG. 6 is a second example illustrating a profile of potential cache misses for one function as contained in the access table.

As result of the first part of the invention, profiles of potential cache misses per cache line for each function are prepared in the access table. The numeric data contained in the access table can be illustrated as is shown in FIG. 6 by example of one function.

For each cache line in the scope of a function, the corresponding number of potential cache misses can be displayed as a column in a bar graph. Referring to FIG. 6, in the first cache line 601 in the scope of the function the number of potential cache misses counted in the instruction trace is represented by bar 602. For program parts that have not been executed during simulation, no potential cache misses will be counted, as illustrated by the zero-bar 604 in cache line 603. The maximum number of potential cache misses (bar 606) in this example occurs in cache line 605. In general, the distribution of potential cache misses in one function can be quite irregular since some code parts are frequently executed and some not.

Figure 7:
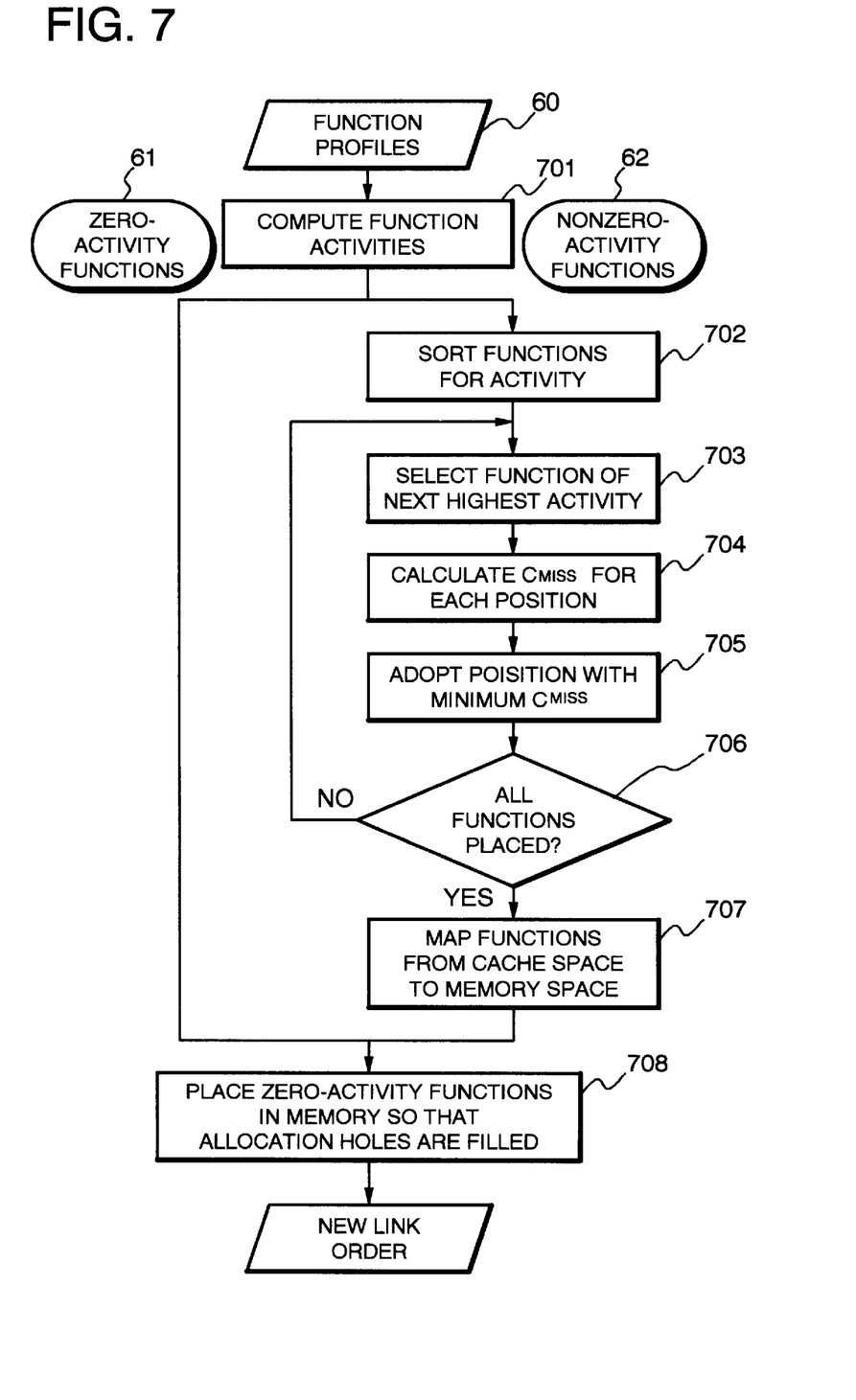
FIG. 7 is a flow chart illustrating the second part of the invention where functions are successively allocated to memory.

Now the second part of the invention is explained with help of the flow diagram shown in FIG. 7. The input data to the algorithm of the second part are the function profiles 60 collected in the first part of the invention.

In this algorithm, first a value is computed for each function which represents its activity in terms of cache utilization (Step 701). The activity of a function is computed as its average number of possible cache misses per cache line by the following formula (1).

$$\text{Activity} = \frac{\sum_{\text{all cache lines of function}} \text{Potential Cache Misses per Cache Line}}{\text{Number of Cache Lines per Function}} \quad (1)$$

When computing the function's activities, also zero-activity functions 61 will be detected which have not been executed during simulation and for which therefore no potential cache misses are counted. The zero-activity functions 61 will be separated from the nonzero-activity functions 62 for the following steps of the algorithm. The nonzero-activity functions 62 are sorted for their activity as computed before to determine the processing order for the next steps, where functions are handled one by one successively (Step 702).

Then, from the list of sorted nonzero-activity functions 62, the one with highest activity is selected (Step 703), and for each position of this function in cache space, a characteristic value $C_{Miss}$ is calculated according to the following formula (2) (Step 704).

$$C_{\text{Miss}} = \sum_{\text{all cache lines}} \left( \sum_{\text{all functions}} \text{Profile Data per Cache Line} \right)^2 \quad (2)$$

That position in cache which leads to the minimum value for $C_{Miss}$ is adopted for the currently processed function (Step 705), and the steps 703, 704 and 705 are repeated with the next function in the list, until all nonzero-activity functions 62 have finally been placed to a position in cache space (Step 706).

After finishing the successive allocation to cache space, the nonzero-activity functions 62 are mapped from the cache space to the memory space so that each instruction will be assigned to a unique memory address (Step 707). This mapping may introduce allocation holes between functions in the memory space. Therefore, in a final step, the zero-activity functions 61 are mapped to the memory space so as to fill the emerged allocation holes as good as possible (Step 708).

Figure 8:
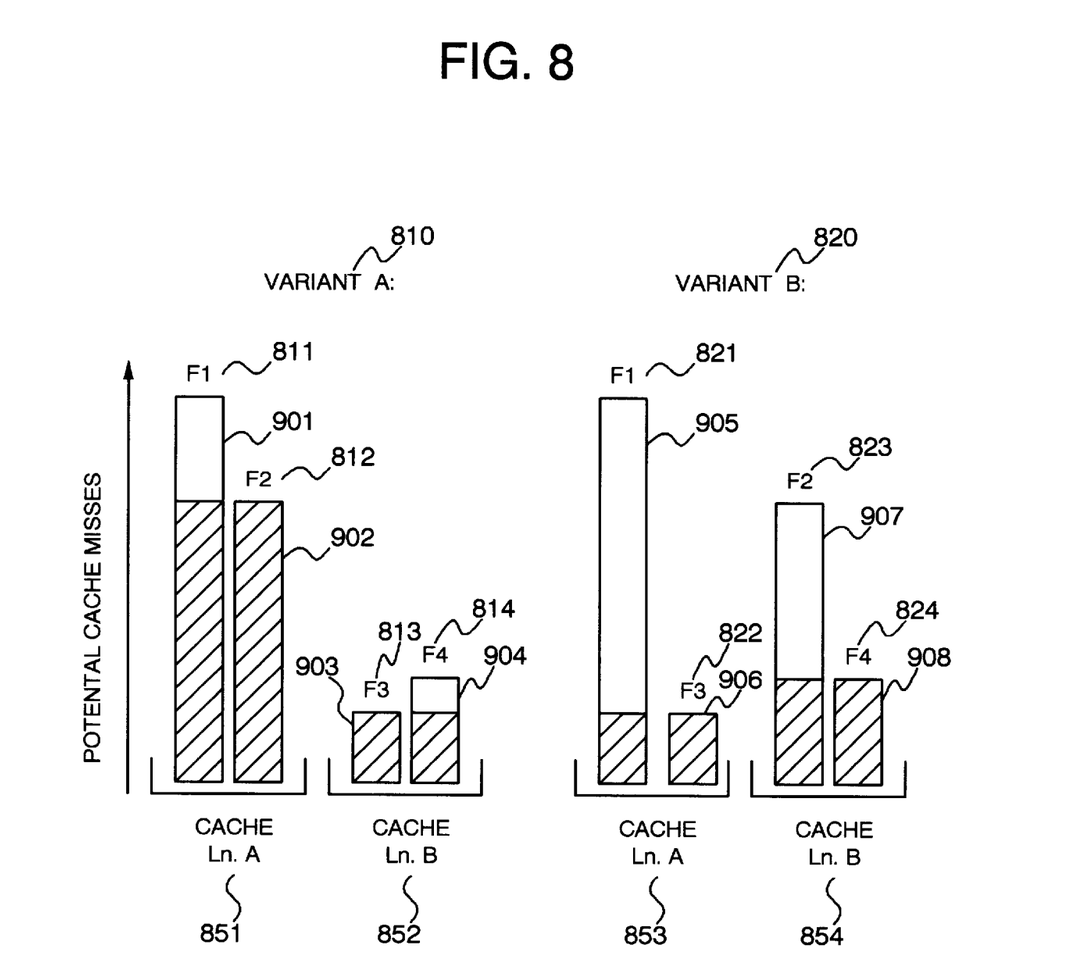
FIG. 8 is a diagram illustrating two variants of profile distribution over cache lines.

The application of the formula (2) can be justified with help of FIG. 8, which shows two variants of profile value distribution over cache lines. In variant A 810, two functions F1 811 and F2 812 with high numbers of potential cache misses 901, 902 have to share the same cache line A 851. Two other function F3 813 and F4 814, both with much lower numbers of potential cache misses 903, 904, share another cache line B 852.

The maximum number of possible cache misses per cache line is then determined by the lower of both numbers of potential cache misses per cache line, because this many times each function can be replaced from the cache line in the worst case, leading to a cache miss in the next function call. In consequence, in variant A 810, the maximum number of possible cache misses calculates to two times the potential cache misses 902 of function F2 812 in cache line A 851 plus two times the potential cache misses 903 of function F3 813 in cache line B 852. In variant B 820, in contrast, the same function are distributed over cache lines in a different way: function F1 821 with a high number of potential cache misses 905 shares cache line A 853 with function F3 822 with a low number of potential cache misses 906, and function F2 823 with a high number of potential cache misses 907 shares cache line B 854 with function F4 824 with a low number of potential cache misses 908.

Since again the maximum number of possibly arising cache misses is determined by the lower number of potential cache misses per cache line, the sum calculates to two times the potential cache misses 906 of function F3 822 plus two times the potential cache misses 908 of function F 824, which results in a much lower cache miss probability than for variant A 810.

As conclusion, it has to be avoided that code parts with high numbers of potential cache misses share the same cache line since this would lead to a high cache miss probability. Instead, the best result is achieved, when the sum of potential cache misses per cache line over all functions is nearly equal for all cache lines. A mapping with this quality is achieved by applying the formula (2). Since the accumulated profile data is squared per cache line before the sum is calculated over the whole cache space, high values of potential cache misses are overproportionally weighted in the overall sum. The characteristic value $C_{Miss}$ therefore assumes its minimum the most equal distribution of potential cache misses over cache lines. By adopting the allocation which leads to the minimum value of $C_{Miss}$ the cache miss probability is therefore minimized.

As result of the second part of the invention, for each function of the target program a start address is determined where it has to be placed to in the memory. Actual memory placement is accomplished by a linker which takes the function start addresses as input and creates the program layout accordingly, including the insertion of allocation holes where necessary.

Figure 9:
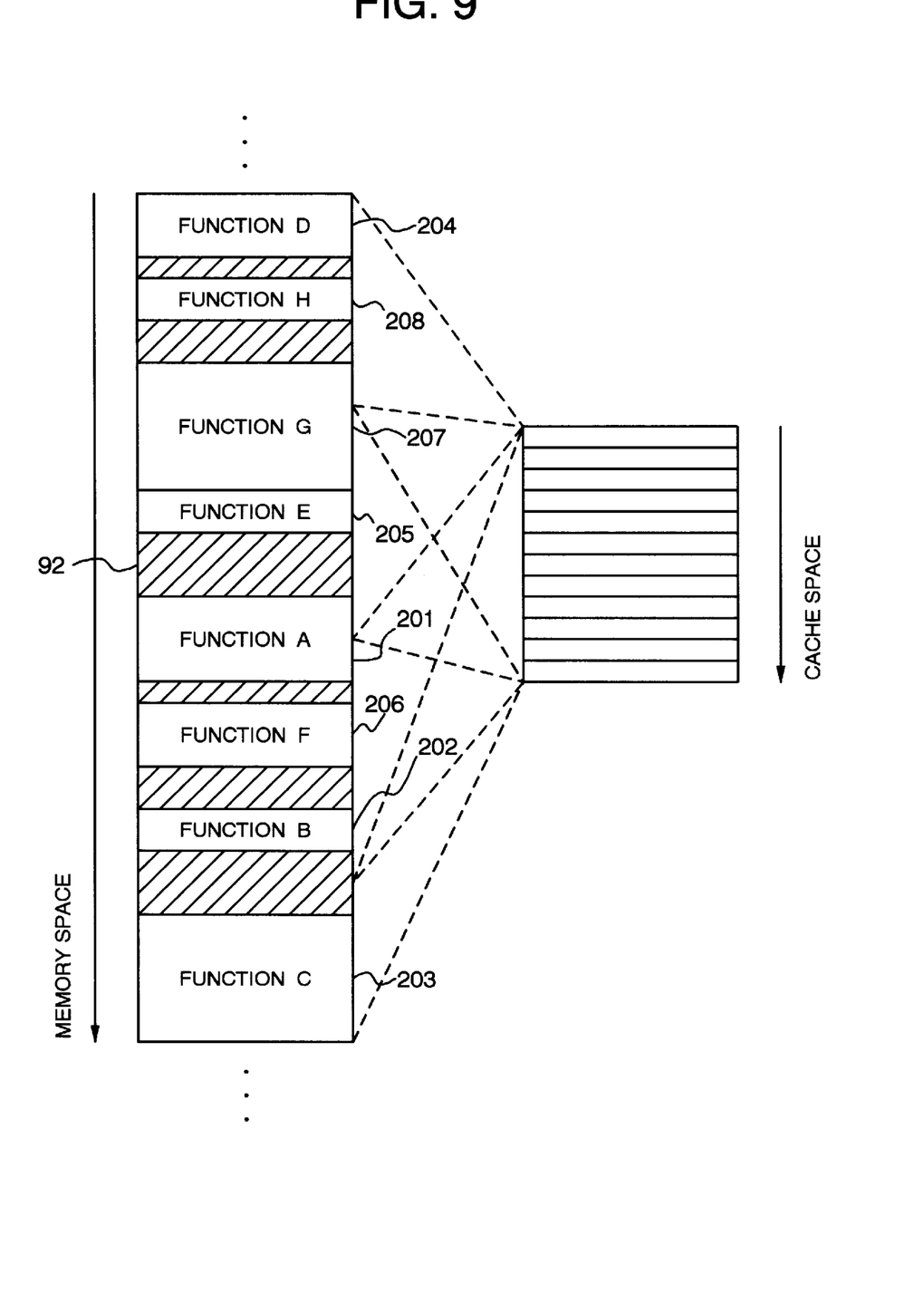
FIG. 9 is a diagram illustrating the memory layout of a typical program after application of the invention.

FIG. 9 shows a possible memory layout for the example functions from FIG. 2 after application of the invention. The functions, previously in the order A, B, C, D E, F, G and H, are now arranged in the memory in the order function D 204, function H 208, function G 207, function E 205, function A 201, function F 206, function B 202 and function C 203. Moreover, allocation holes 92 are inserted to achieve the desired mapping of functions to their intended start addresses.

When executing the target program in its new memory layout, a significantly reduced instruction cache miss rate will be observed since mutual replacement of frequently executed code parts is minimized.

In many RISC architectures, direct-mapped caches are employed for their simplicity and short access times to alleviate the gap between processor clock and memory access time. The direct-mapped organization, however, can lead to frequent cache line conflicts during program execution in case of unfavourable code layout, resulting in serious performance degradation. By application of the invention in program development, instruction cache conflicts between frequently executed code parts are minimized and performance is significantly enhanced. The invention is characterized by low computation complexity and is easy to implement in a linker; hardware modifications are not required to enhance cache performance.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A method for the reduction of instruction cache misses in an application program running on a microprocessor having an instruction cache, said method comprising the steps of:

generating profiles of potential cache misses by extracting potential cache misses from an instruction trace and storing them into an access table;

detecting first functions where potential cache misses are counted and second functions where no potential cache misses are counted by computing function activities of the application program based on said profiles;

allocating all the first functions to a cache space;

mapping the first functions allocated to said cache space to a memory space; and mapping the second functions so as to fill allocation holes in said memory space.

2. A method for the reduction of instruction cache misses as set forth in claim 1, wherein said step of generating profiles comprises the steps:

collecting instruction trace data through simulation;

generating a function table which contains for each function of said application program the address range in the memory space, divided into cache line units according to the organization of the cache space of said instruction cache;

counting only memory accesses to instructions listed in the instruction trace data to each of the cache line units based on said function table within execution of one function of said application program; and storing in said access table the number of the counted accesses for cache line unit of each function of the application.

3. A method for the reduction of instruction cache misses as set forth in claim 1, wherein said step of allocating the first functions to the cache space comprises the steps:

sorting the first functions according to the activities of the potential cache misses which have been computed based on the profiles to determine the order of successive allocation;

selecting the first function with highest activity value from the unprocessed first functions;

determining each position of the first functions in the cache space so as to lead the profiles to the most equal distribution; and mapping the first functions from the cache space to the memory space so that each instruction is assigned to a unique memory address, after finishing the allocation to the cache space with respect to all the first functions of said application program.

4. A method for the reduction of instruction cache misses as set forth in claim 1, wherein said step of generating profiles comprises the steps:

collecting instruction trace data through simulation;

generating a function table which contains for each function of said application program the address range in the memory space, divided into cache line units according to the organization of the cache space of said instruction cache;

counting only memory accesses to instructions listed in the instruction trace data to each of the cache line units based on said function table within execution of one function of said application program; and storing in said access table the number of the counted accesses for cache line unit of each function of said application program, while said step of allocating the first functions to the cache space comprises the steps:

sorting the first functions according to the activities of the potential cache misses which have been computed based on the profiles to determine the order of successive allocation;

selecting the first function with highest activity value from the unprocessed first functions;

determining each position of the first functions in the cache space so as to lead the profiles to the most equal distribution; and mapping the first functions from the cache space to the memory space so that each instruction is assigned to a unique memory address, after finishing the allocation to the cache space with respect to all the first functions of said application program.

5. A method for the reduction of instruction cache misses as set forth in claim 1, wherein said step of generating profiles comprises the steps:

collecting instruction trace data through simulation;

generating a function table which contains for each function of said application program the address range in the memory space, divided into cache line units according to the organization of the cache space of said instruction cache;

counting only memory accesses to instructions listed in the instruction trace data to each of the cache line units based on said function table within execution of one function of said application program; and storing in said access table the number of the counted accesses for cache line unit of each function of said application program, while said step of counting the memory accesses counts only the first access listed in the instruction trace and counts the first accesses to the cache line units again whenever a new function call has occurred in said application program.

6. A method for the reduction of instruction cache misses in an application program running on a microprocessor with an instruction cache, said method comprising the steps of:

extracting profiles of potential cache misses from an instruction trace under consideration of original function layouts and cache parameters;

sorting the functions of said application program according to the profiles of the potential cache misses;

allocating the functions to the cache space successively so as to lead the profiles to the most equal distribution;

mapping all the functions from the cache space to the memory space while inducing allocation holes; and linking the functions in the predetermined order while inserting the allocation holes where necessary.

7. A computer readable memory having a computer program for reducing instruction cache misses in an application program running on a microprocessor with an instruction cache, said computer program comprising the steps of:

generating profiles of potential cache misses by extracting potential cache misses from an instruction trace and storing them into an access table;

detecting first functions where potential cache misses are counted and second functions where no potential cache misses are counted by computing function activities of the application program based on said profiles;

allocating all the first functions to a cache space;

mapping the first functions allocated to said cache space to a memory space; and mapping the second functions so as to fill allocation holes in said memory space.

8. A computer readable memory having a computer program for reducing instruction cache misses as set forth in claim 7, wherein said step of generating profiles comprises the steps:

collecting instruction trace data through simulation;

generating a function table which contains for each function of said application program the address range in the memory space, divided into cache line units according to the organization of the cache space of said instruction cache;

counting only memory accesses to instructions listed in the instruction trace data to each of the cache line units based on said function table within execution of one function of said application program; and storing in said access table the number of the counted accesses for cache line unit of each function of the application.

9. A computer readable memory having a computer program for reducing instruction cache misses as set forth in claim 7, wherein said step of allocating the first functions to the cache space comprises the steps:

sorting the first functions according to the activities of the potential cache misses which have been computed based on the profiles to determine the order of successive allocation;

selecting the first function with highest activity value from the unprocessed first functions;

determining each position of the first functions in the cache space so as to lead the profiles to the most equal distribution; and mapping the first functions from the cache space to the memory space so that each instruction is assigned to a unique memory address, after finishing the allocation to the cache space with respect to all the first functions of said application program.

10. A computer readable memory having a computer program for reducing instruction cache misses as set forth in claim 7, wherein said step of generating profiles comprises the steps:

collecting instruction trace data through simulation;

generating a function table which contains for each function of said application program the address range in the memory space, divided into cache line units according to the organization of the cache space of said instruction cache;

counting only memory accesses to instructions listed in the instruction trace data to each of the cache line units based on said function table within execution of one function of said application program; and storing in said access table the number of the counted accesses for cache line unit of each function of said application program, while said step of allocating the first functions to the cache space comprises the steps:

sorting the first functions according to the activities of the potential cache misses which have been computed based on the profiles to determine the order of successive allocation;

selecting the first function with highest activity value from the unprocessed first functions;

determining each position of the first functions in the cache space so as to lead the profiles to the most equal distribution; and mapping the first functions from the cache space to the memory space so that each instruction is assigned to a unique memory address, after finishing the allocation to the cache space with respect to all the first functions of said application program.

11. A computer readable memory having a computer program for reducing instruction cache misses as set forth in claim 7, wherein said step of generating profiles comprises the steps:

collecting instruction trace data through simulation;

generating a function table which contains for each function of said application program the address range in the memory space, divided into cache line units according to the organization of the cache space of said instruction cache;

counting only memory accesses to instructions listed in the instruction trace data to each of the cache line units based on said function table within execution of one function of said application program; and storing in said access table the number of the counted accesses for cache line unit of each function of said application program, while said step of counting the memory accesses counts only the first access listed in the instruction trace and counts the first accesses to the cache line units again whenever a new function call has occurred in said application program.

12. A computer readable memory having a computer program for reducing instruction cache misses in an application program running on a microprocessor with an instruction cache, said computer program comprising the steps of:

extracting profiles of potential cache misses from an instruction trace under consideration of original function layouts and cache parameters;

sorting the functions of said application program according to the profiles of the potential cache misses;

allocating the functions to the cache space successively so as to lead the profiles to the most equal distribution;

mapping all the functions from the cache space to the memory space while inducing allocation holes; and linking the functions in the predetermined order while inserting the allocation holes where necessary.

* * * * *